(12) United States Patent
Monkelbaan et al.

(10) Patent No.: US 6,293,528 B1
(45) Date of Patent: Sep. 25, 2001

(54) FRACTIONATION APPARATUS WITH LOW SURFACE AREA GRID ABOVE TRAY DECK

(75) Inventors: Daniel R. Monkelbaan, Amherst; Michael R. Resetarits, De Pew, both of NY (US); Robert J. Miller, Houston, TX (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/277,072

(22) Filed: Mar. 26, 1999

Related U.S. Application Data
(60) Provisional application No. 60/082,737, filed on Apr. 23, 1998.

(51) Int. Cl.[7] .................................. B01F 3/04; B01D 3/22
(52) U.S. Cl. ........................ 261/114.1; 261/97; 261/108; 261/113
(58) Field of Search .................... 261/108, 109, 261/113, 114.1, 114.3, 97

(56) References Cited

U.S. PATENT DOCUMENTS

| | | | |
|---|---|---|---|
| 1,748,595 | * 2/1930 | Chillas et al. | 261/114.1 |
| 2,767,967 | 10/1956 | Hutchinson | 261/113 |
| 2,832,578 | * 4/1958 | Gilmore | 261/114.1 |
| 3,410,540 | 11/1968 | Bruckert | 261/11 |
| 4,105,723 | * 8/1978 | Mix | 261/109 |
| 4,304,738 | * 12/1981 | Nutter | 261/114.1 |
| 4,556,522 | * 12/1985 | Wilson | 261/114.1 |
| 4,627,941 | * 12/1986 | Bentham | 261/109 |
| 4,820,456 | * 4/1989 | Kiselev | 261/113 |
| 4,842,778 | 6/1989 | Chen et al. | 261/97 |
| 5,244,604 | * 9/1993 | Miller et al. | 261/97 |
| 5,262,094 | * 11/1993 | Chuang | 261/97 |
| 5,382,390 | 1/1995 | Resetarits et al. | 261/114.3 |
| 5,389,343 | 2/1995 | Gentry | 422/191 |
| 5,407,605 | * 4/1995 | Resetarits et al. | 261/114.3 |

FOREIGN PATENT DOCUMENTS 0 381 388    8/1990   (EP).

OTHER PUBLICATIONS

Chen et al., "Performance of Combined Mesh Packing and Sieve Tray in Distillation," *The Canadian Journal of Chemical Engineering*, vol. 68, Jun., 1990, pp. 382–386.

Chen, Gilbert K., "Packed column internals," *Chemical Engineering*, Mar. 5, 1984, pp. 40–51.

\* cited by examiner

*Primary Examiner*—David A. Simmons
*Assistant Examiner*—Jason M. Greene
(74) *Attorney, Agent, or Firm*—John G. Tolomei; John F. Spears, Jr.

(57) ABSTRACT

The flooding capacity of a fractionation tray (2) is increased by the addition of at least one layer of low surface area grids (3) above the inlet to the downcomers (6,12) located on the tray (2). The grids (3) extend upward for a distance equal to one to four times the depth of the downcomers. The grids may rest upon the top edge of the downcomers or on the tray decking between the top portions of the downcomer sidewalls.

14 Claims, 9 Drawing Sheets

Fig. 10
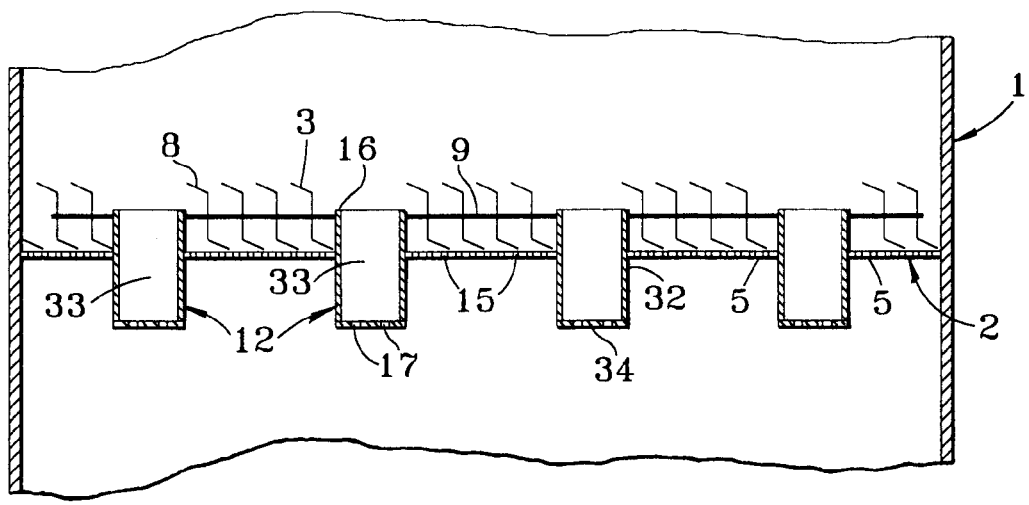
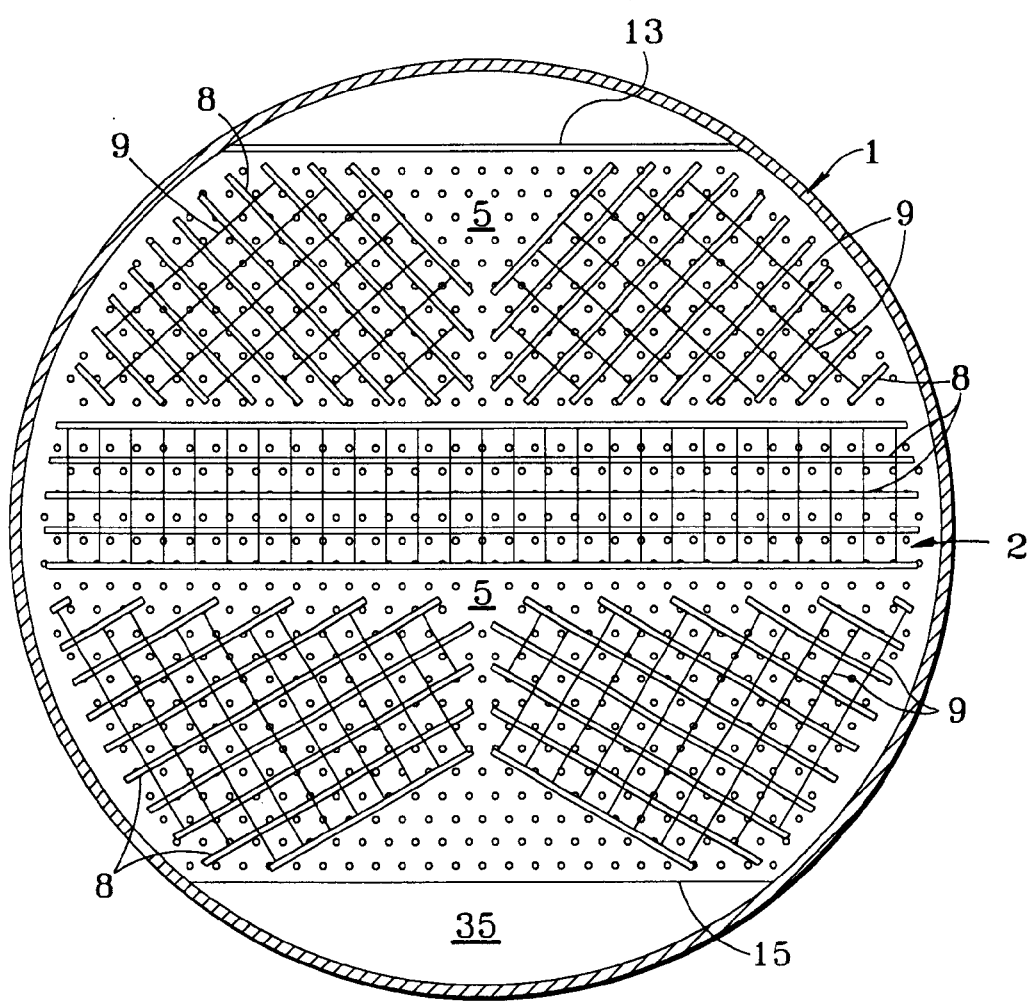
Fig. 11

FRACTIONATION APPARATUS WITH LOW SURFACE AREA GRID ABOVE TRAY DECK

CROSS REFERENCE TO PRIOR APPLICATION

This application claims the benefit of the filing date of Provisional Application No. 60/082,737 filed Apr. 23, 1998.

FIELD OF THE INVENTION

The invention relates to gas-liquid contacting apparatus used primarily as fractionation trays for the separation of volatile chemical compounds in a fractional distillation column.

BACKGROUND OF THE INVENTION

Fractionation trays are widely used in the petrochemical and petroleum refining industries to promote the multistage vapor-liquid contacting performed in fractionation columns. The normal configuration of a fractionation column includes about 10 to 120 individual trays. Normally each tray is the same. The trays are mounted horizontally at uniform vertical distances referred to as the tray spacing of the column. This distance may vary within different parts of the column but is normally considered constant. Vapor generated at the bottom of the column rises through the tray which supports a quantity of liquid. The passage of the vapor through the liquid generates bubbles referred to as froth. The high surface area of the froth helps to quickly establish a compositional equilibrium between the vapor and liquid phases on the tray. The vapor loses less volatile material to the liquid and thus becomes slightly more volatile as it passes upward through each tray. The liquid separates from the froth and carries heavier components downward to the next lower tray. This froth formation and separation is performed on each tray. Trays therefore perform the two functions of contacting the rising vapor with liquid and then allowing the two phases to separate and flow in different directions. When the steps are performed a suitable number of times, the process can lead to highly effective separation of chemical compounds based upon their relative volatility.

RELATED ART

U.S. Pat. No. 3,410,540 illustrates a fractionation tray design comprising alternating decking sections and downcomers typical of a multiple downcomer tray. This tray design employs a rectangular cross-section downcomer. U.S. Pat. No. 5,382,390 illustrates modern developments in multiple downcomer tray design.

U.S. Pat. No. 2,767,967 illustrates a type of dual flow tray referred to in the art as a ripple tray. In this tray the rising vapor and descending liquid both pass through the same openings in the surface of the tray deck. The deck may have many topologies ranging from the sinosoidal curve of FIGS. 3 and 4 to the more planar shape of FIGS. 5 and 6 (see column 3, line 11). The variations in the elevation allow for less liquid depth on higher portions of tray which in turn allows for upward vapor passage, while liquid descends through the tray at points which allow for a greater liquid depth.

U.S. Pat. No. 5,407,605 illustrates fractional distillation column trays having a bed of packing material located below the trays and wetted by liquid exiting the downcomers.

U.S. Pat. No. 5,389,343 describes a fractionation column in which bundles of catalyst media used to promote chemical reactions are hung beneath fractionation trays to promote vapor phase reactions.

An article by G. X. Chen et al. appearing at page 382 of Volume 68 (June 1990) edition of *The Canadian Journal of Chemical Engineering* describes the performance of fractionation trays having layers of stainless steel knitted mesh packing placed on the top surface of the tray. This paper appears related to European Patent application No. 0381388 by the same authors.

A description of various types of packing materials for use in packed columns is provided in an article starting at page 40 of Chemical Engineering, Mar. 5, 1984.

U.S. Pat. No. 4,842,778 illustrates a fractional distillation column containing "random" (dumped) packing, structured packing and support grids.

BRIEF SUMMARY OF THE INVENTION

The subject invention is a high capacity fractionation tray which comprises a relatively thick layer of low surface area, highly vertical "grid" packing resting on the topmost surface of the tray deck or downcomer. The volume above the grid is preferably empty. This results in the tray having an unexpectedly increased vapor capacity. Additional packing material having a higher surface area may rest upon the grid packing to increase the efficiency of the overall tray system.

One embodiment of the invention may be characterized as a vapor-liquid contacting apparatus comprising a vertical enclosed column (1) having a circular cross section and an upper first end (20) and a lower second end (21); a plurality of evenly spaced-apart fractionation trays including a pair of vertically spaced apart fractionation trays (2) comprising a lower first and an upper second tray, with the trays being substantially planar and extending horizontally across substantially all of the cross-sectional area of the column (1), and with the trays (2) having perforations (15) evenly distributed across decking sections (5) of the tray (2), which decking sections are devoid of downcomers (12,6); and, a layer comprising low surface area structured grid packing (3) supported by the first tray (2) of said pair of fractionation trays, with the layer of structured grid packing (3) extending upward toward the second tray for a distance equal to from about one-tenth to about three-quarters of the vertical distance between the first and second trays. A sizable void volume may be present above the grid packing.

In some embodiments of the present invention a bed of structured or random (dumped) packing material is present on top of the low surface area grid structures, with the packing being wetted by liquid exiting the downcomers of the upper second tray. A further thin layer of the low surface area grid structure may rest upon the random packing.

BRIEF DESCRIPTION OF THE DRAWINGS

FIG. 10 is a sectional view across a portion of a column 1 containing a multiple downcomer tray (2) having low surface area grids (3) resting on the tray decks (5).

FIG. 11 is an overhead view of a crossflow tray employing low surface area grids (3) to increase vapor capacity and reduce liquid stagnation on the edges of the tray.

DETAILED DESCRIPTION AND PREFERRED EMBODIMENTS

Figure 1:
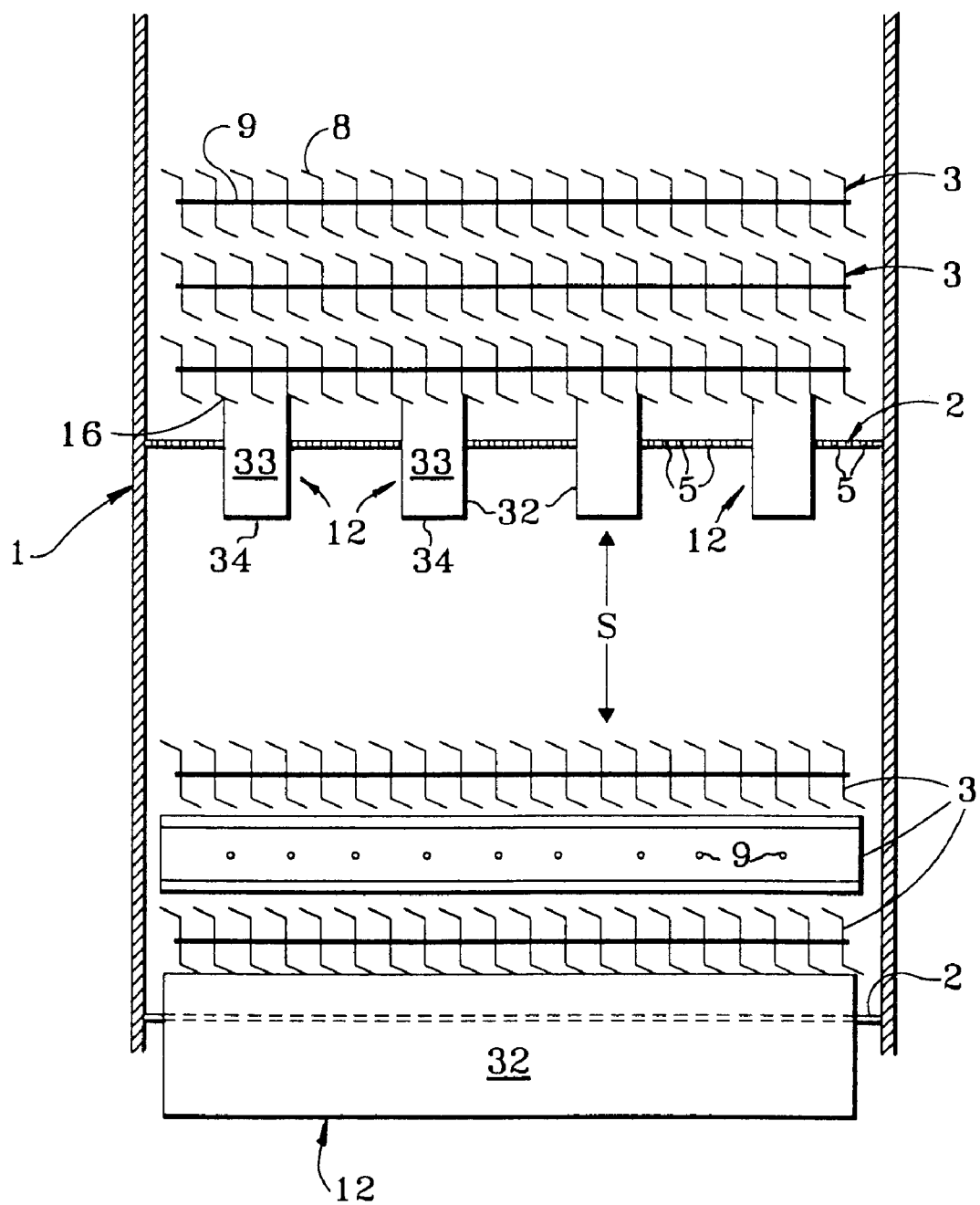
FIG. 1 is a sectional side view of a portion of a fractionation column using the subject invention on a multiple downcomer tray (2) having rectangular downcomers (12).

In a fractional distillation column a multicomponent feed stream is separated into an overhead vapor stream comprising a more volatile chemical compound and a bottoms liquid stream comprising a less volatile compound. That is, the compounds entering the column are separated therein, with the more volatile compound(s) being carried upward through the column by an ascending vapor stream. The vapor stream passes through the trays and eventually exits the column as an overhead vapor. A portion of the condensate derived from the overhead vapor is normally returned as liquid-phase reflux. The less volatile component(s) of the feed are concentrated into the descending liquid-phase stream and eventually removed from the bottom of the column. Heat and vapor are supplied to the bottom of the column by a reboiler as by vaporizing a portion of the bottoms liquid and returning it to the column.

Fractionation trays are employed within the column as a means of promoting vapor-liquid contacting and froth formation which leads to the exchange of compounds between the vapor and liquid phases based upon their relative volatility. The trays are spaced at uniform vertical distances referred to as the tray spacing. The trays have separate areas devoted to the upward passage of vapor, which are normally referred to as the decking of the tray and other areas which collect the froth. The froth is allowed to decompose releasing "clear liquid" which descends to the next lower tray through a part of the tray referred to as a downcomer. Due to the high economic impact of column cost and the importance of a good separation, which is required in most refining and petrochemical processes, there has been much development in the area of fractionation tray design.

Fractionation trays find utility in the separation of a wide variety of chemicals including hydrocarbons, alcohols, amines and ethers in petroleum refineries and petrochemical and chemical manufacturing plants. As with any useful industrial equipment there are constant competitive demands to improve the performance and/or lower the cost of the equipment. The result has been the development of several different types of trays, each having its own advantages and disadvantages. A simple pictorial depiction of several different types of trays; e.g. sieve trays, dual flow trays and Turbogrid trays is provided at pages 3–4 of *Distillation tray fundamentals,* by M. J. Lockett published by Cambridge University Press, 1986.

Some trays, such as multiple downcomer trays, have an advantage of being able to handle high liquid flows. Others such as dual flow trays have the advantage of low cost. However, most tray types also have at least one characteristic or disadvantage which limits their performance or their application to a particular separation. Column design therefore often includes a compromise between various tray design characteristics in order to obtain the best balance of cost and performance characteristics over the expected range of operating conditions.

One of the disadvantages of some trays is a higher cost of manufacturing the tray, which is greatly influenced by the complexity of its design. The more pieces required to assemble a tray, the more it costs to fabricate and then assemble the pieces into the finished tray. A dual flow tray is a very simple tray and has the advantage of low manufacturing and installation costs. A dual flow tray typically comprises a flat deck with uniform perforations sized large enough to allow both liquid to descend and vapor to rise through the same openings. Dual flow trays therefore do not have downcomers or other accessories and are low in cost. However, dual flow trays tend not to work very well at tray diameters larger than four feet. Dual flow trays will normally have a tray open area provided by perforations of about 20–40%. In contrast, the flat decks of a normal crossflow sieve tray or a multiple downcomer tray will usually have an open area less than about 20%.

Ripple trays are similar to dual flow trays but have variations in the height of the tray deck as shown in previously cited U.S. Pat. No. 2,767,967. These variations provide depressions which allow liquid to collect and drain to the next tray much like a downcomer. Dual flow and ripple trays are very sensitive to departures from the optimum (design) fluid flow rates.

A specific type of tray is the multiple downcomer tray shown in the previously cited U.S. Pat. Nos. 3,410,540 and 5,382,390. This tray is also described in an article appearing at page 72 of the Apr. 3, 1978 edition of *The Oil and Gas Journal.* This article includes a figure showing the basic characteristics of a multiple downcomer tray including a plurality of long, parallel trough-like downcomers evenly spaced across the surface of the tray, with bands of planar decking located therebetween. The preferred grouping of the liquid sealable outlets in the bottom of the downcomers and the traverse or perpendicular alignment of the downcomers on vertically adjacent downcomers is also shown. These trays have several advantages including great flexibility in operation and mechanical height, very good capacity which allows their use in debottlenecking existing columns, the ability to function at relatively small vertical tray spacings, and the ability to handle high liquid loads due to a high ratio of downcomer inlet length to deck area. However, as with any tray there is always a desire to increase performance.

Traditional crossflow trays use downcomers extending downward to near the next lower tray to handle the liquid flow and achieve higher tray efficiencies, but sometimes have the disadvantage of being more costly to fabricate and install. The simplest crossflow tray has only one outlet downcomer. More complicated multi-pass trays can have two, three or four separate inlets and outlets, with each outlet normally having an outlet weir which controls the liquid level on the tray.

Thus, there exists a wide variety of different tray constructions which can employ the subject invention. It is believed the subject invention can be used to augment the performance of many different types of trays including as multiple downcomer trays, dual flow trays, ripple trays and crossflow trays having a variety of downcomer structures.

It is an objective of the subject invention to provide an improved fractionation tray for use in fractional distillation. It is a further objective of this invention to provide a low cost high vapor capacity fractionation tray. It is a specific objective of the invention to provide increased vapor capacity in high liquid capacity multiple downcomer fractionation trays.

These objectives have been achieved through the discovery that the placement of a layer of low surface area grid material on the surface of a fractionation tray allows the tray to operate at much higher upward vapor rates without "flooding". That is, the tray is able to perform in an effective manner at much higher gas rates with the subject invention than without it.

The subject invention was accidentally discovered during testing intended to locate a means to increase the liquid capacity and efficiency of trays. It has been found to unexpectedly increase the vapor capacity of multiple downcomer type trays and provides a means to improve tray and column capacity. The subject invention also provides a way to overcome disadvantages inherent in some tray designs and therefore provides a broader range of tray choices in the design of a fractional distillation column.

The subject invention was discovered during tests to determine the performance characteristics of tray configurations having high surface area random or dumped packing located above the trays of a column. The low surface area grid was being used to support the high surface area packing. A test performed without any high surface area packing on the tray revealed the benefits of the invention. The test was performed using only the single layer of low surface area grid, which had been employed to support the high surface area packing. The tray used in this test was a multiple downcomer tray having V-shaped downcomers as more fully described in U.S. Pat. No. 5,407,605.

Following the discovery of the benefit of a thin layer of grid, the performance of tray systems comprising layers of low surface area grids 35 cm (13.75 in) and 56 cm (22 in) high was separately determined. The grids were simply placed upon the top surface of the tray, which employed V-shaped downcomers. The grids were Nutter Engineering "Snap Grids", with each grid being about 70 mm (2.75 in) high and having a space of about 2.5 cm (1 in) between the parallel blades. These grids had a surface area of about 12 $ft^2/ft^3$. The vertical tray spacing was 76 cm (30 in) with water and air being used as the operating fluids. Water and air are very good simulants for simple hydrocarbons. While multiple downcomer trays are normally designed to operate at an F-factor of about 0.30 fps, it was found that the grid-augmented tray apparatus ran without flooding at F-factors between 0.51 and 0.60 fps. It was very surprising to observe that even at these high vapor rates, the trays were not blown dry. The grids seemed to stabilize the froth and delayed the transition from a froth regime to a spray regime. Perhaps more importantly the grids appeared to be well wetted and capable of promoting mass transfer.

The term "low surface area grid" is intended to refer to a structure formed from a series of highly imperforate parallel blades which have at least a major portion of each wall-like blade aligned substantially perpendicular to the tray decking surface and rigidly fixed a set distance apart from each other in the manner of a three-dimensional grid or screen. The low surface area grids or grid bundles of the subject invention have a surface area of about 6 to about 24 $ft^2/ft^3$. This low surface area distinguishes these grids from honeycomb structure grids having more closely-spaced walls.

Low surface area grid systems for use in the subject invention are available commercially. Suitable examples are "Snap Grid" sold by Nutter Engineering, "C-Grid" sold by Glitsch Inc. and "Flexigrid" No. 2 & 3 sold by Koch Engineering. These grids are characterized by being formed from relatively smooth metal blades having only a few large holes, if perforated. The individual metal blades extend horizontally across the grid bundle and are commonly held in place by perpendicular members referred to herein as stringers. These stringers are rods or other small dimension connectors whose primary function is to retain the blades in place. Alternatively, the blades may criss-cross one another at a variety of angles to form vertical channels having a square or diamond cross-section thus eliminating the need for the stringers. In one typical grid the individual blades are about 7 cm high and spaced apart at horizontal distances of about 2.5 to 7 cm. A minimum blade spacing of at least 5 cm is preferred. The blades are generally aligned in a vertical direction. The blades preferably have one or two vertically spaced apart bends to give the blades a three-dimensional structure, which is another distinguishing feature compared to high surface area structured packing. This construction results in an overall grid structure having a low surface area and large open volumes and a relatively low pressure drop when in use.

In comparison to this grid packing, a "dumped" or "random" packing typically has a surface area of about 20 to about 75 $ft^2/ft^3$. These materials have these names because they are normally placed in a contact column by literally dumping them into the column. Examples of commercially available dumped packing include Pall rings and Raschig rings. These materials come in various sizes chosen based upon a specific application and expected flow rates, etc.

The term "high surface area" packing is intended to refer to both structured and dumped (random) packing having a surface area greater than about 45 $ft^2/ft^3$.

The term "structured packing" is used to refer to a more costly, fabricated material typically formed from thin perforated and corrugated strips of metal wrapped into spirals or otherwise held parallel to each other by some form of restraint. The metal strips are much closer together than in a low surface area grid packing, with distances of about 1 to 2 cm being typical. The individual strips may be held apart only by the physical contact of the corrugations or bent out areas of adjacent strips. These materials typically are placed into a column in the form of sizable cubes or slabs having a thickness in excess of about 10 cm, a width greater than about 25 cm and of an overall size which allows easy insertion into the column by available manways and other openings. Examples of these materials are shown in the references cited above. A structured packing of this nature has a surface area in the range of from about 30 to about 210 $ft^2/ft^3$ and preferably above about 100 $ft^2/ft^3$.

A fourth type of contact material or packing is referred to as a "gauze" and is fabricated from a large number of small cross-section strands fastened or woven together to retain a loose open shape. The surface of this material is typically about 150 $ft^2/ft^3$.

The accompanying drawings illustrate by way of example some embodiments of the present invention. Referring now to the Drawings, FIG. 1 represents an embodiment in which the bottom layer of the low surface area grid 3 rests upon the top edge 16 of the sidewall of the rectangular downcomers 12 which are used on the multiple downcomer fractionation tray 2. Other figures show embodiments with other types of trays.

One structural variation in the tray is the number of grid sublayers which are on top of the tray. While FIG. 1 shows three sublayers, this is optional as shown in other Figures. Yet another basic variation shown on FIG. 1 relates to the directional alignment of the blades 8 of the grid 3. The blades on the upper tray are all parallel while the blades of the middle sublayer on the lower tray are perpendicular to adjacent sublayers. Each rectangular downcomer 12 of this tray is comprised of two parallel side walls 32 and two parallel end walls 33. A bottom plate 34 seals the lower portion of the downcomer and the upper end is totally open providing a rectangular entrance to the downcomer. The bottom plate of each downcomer and/or the side walls have a number of perforations to allow the collected liquid to exit and fall upon the packing material located below.

In this embodiment a sizable space "S" denoting a cylindrical void volume in the column is left between the bottom edge of the upper tray, measured from the bottom of the downcomer 12, and the upper surface of the uppermost grid bundle 3 supported by the lower fractionation tray. The provision of this sizable void space normally present between trays is preferred if the tray spacing in the column allows it. Tray spacing is the term used to describe the deck-to-deck vertical distance between trays.

Figure 2:
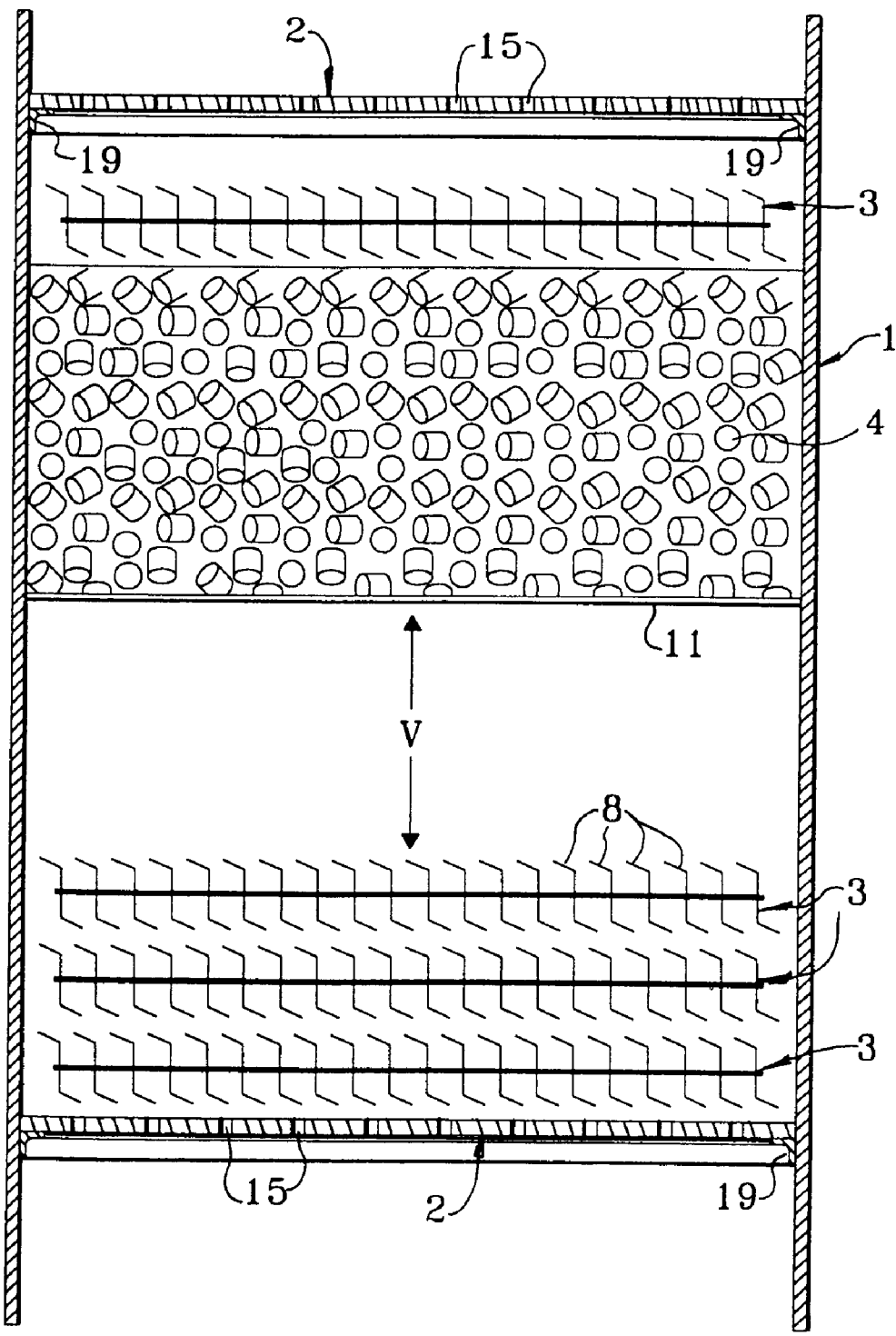
FIG. 2 is a sectional side view of a portion of a fractionation column showing use of the invention with vertically spaced dual flow trays (2) and an optional bed of dumped packing (4).

In FIG. 2 a pair of dual flow trays 2 are shown supported by a circular ring 19 attached to the inner surface of the cylindrical wall of the column 1. Dual flow trays are unique in that they lack downcomers. The relatively large openings 15 in the tray decking are sufficiently large to allow liquid to "weep" downward at the required rate through the perforations while the total vapor flow is simultaneously passing upward through the same perforations. In this embodiment a bundle of three grid 3 sublayers rest directly on the upper surface of the tray decking of the lower tray. Those for the upper tray are not shown. Optional elements shown in this figure include a bed 4 of high surface area random packing supported above the low surface area grid layer by a separate support means such as a screen 11. This provides an empty cylindrical volume "v". An optional layer of low surface grid 3 can be employed above the dumped packing if desired. Preferably there is shallow cylindrical void volume between the top of this optional upper grid layer and the bottom of the upper tray.

Figure 3:
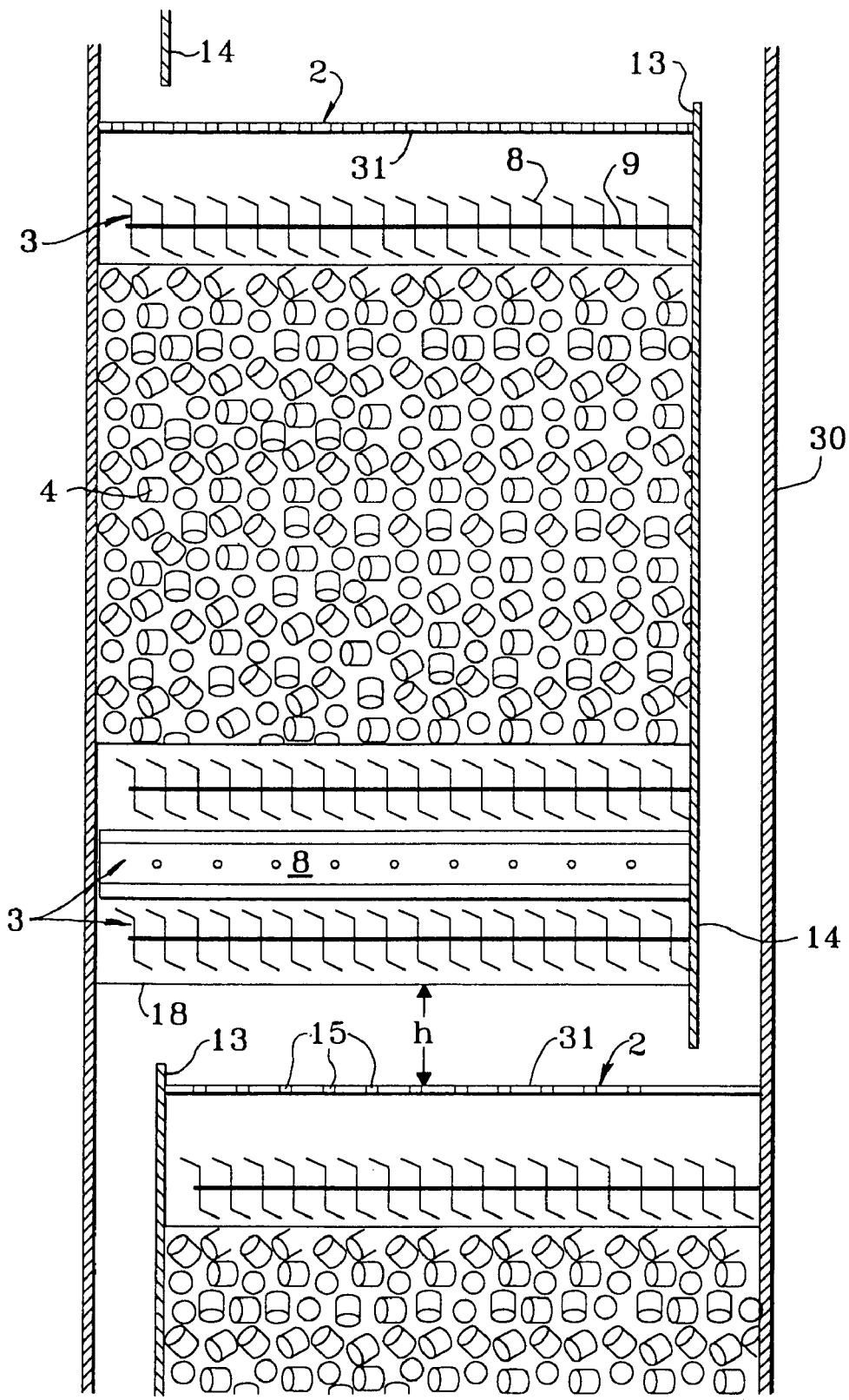
FIG. 3 is a sectional side view of a portion of a fractionation column employing the subject invention with conventional crossflow fractionation trays 2.

FIG. 3 illustrates the subject invention used in a fractionation column having classical crossflow fractionation trays. In this type of tray a single long downcomer formed by the vertical chordal downcomer wall 14 and the inside surface of a portion of the column wall 30 transports the liquid collected on the upper tray 2 to the next lower tray. The liquid flowing down the downcomer impacts upon an imperforate portion of the decking of the tray 2, referred to as a receiving pan, and then flows horizontally across the receiving tray. The liquid eventually flows over an outlet weir 13 on the other side of the tray and enters another downcomer directing the liquid to the next lower fractionation tray. The optional sandwich type structure of an upper layer of low surface area grid 3, an intermediate layer of dumped packing 4 and a bottom portion comprising three sublayers of low surface area grid 3 is similar to the embodiment of FIG. 2 except there is no intermediate void volume. The three sublayers of grid are aligned in different directions. The middle layer is preferably rotated perpendicular to the other two layers.

The bottom sublayer of low surface area grid is supported a distance "h" above the upper surface of the lower fractionation tray by a horizontal grid support means 18 which extends from the wall 30 of the vessel to the chordal wall 14 of the downcomer. The grid could also be supported by an upward projection(s) from the tray intended primarily for this purpose, by other parts of the tray or by legs attached to the grid. The distance h is preferably equal to one to three times the height of one blade of the grid bundle. In this embodiment the vapor passes upward through the holes 15 in the tray deck and rises upward carrying froth into the low surface area grid bundle. While this will wet the surface of the grid bundle, the upward vapor cannot carry the liquid any substantial distance upward beyond the grid. The bed 4 will be ineffective if dry. Therefore a means, not shown on the Drawing, is used to divert a portion of the liquid from the deck 31 of the next higher tray onto the upper surface of the bed 4 of packing materials located between the trays. These devices may take the form of a few spaced-apart larger diameter perforations in the decking which allow for weeping, channels, or even piping systems and valves.

Figure 4:
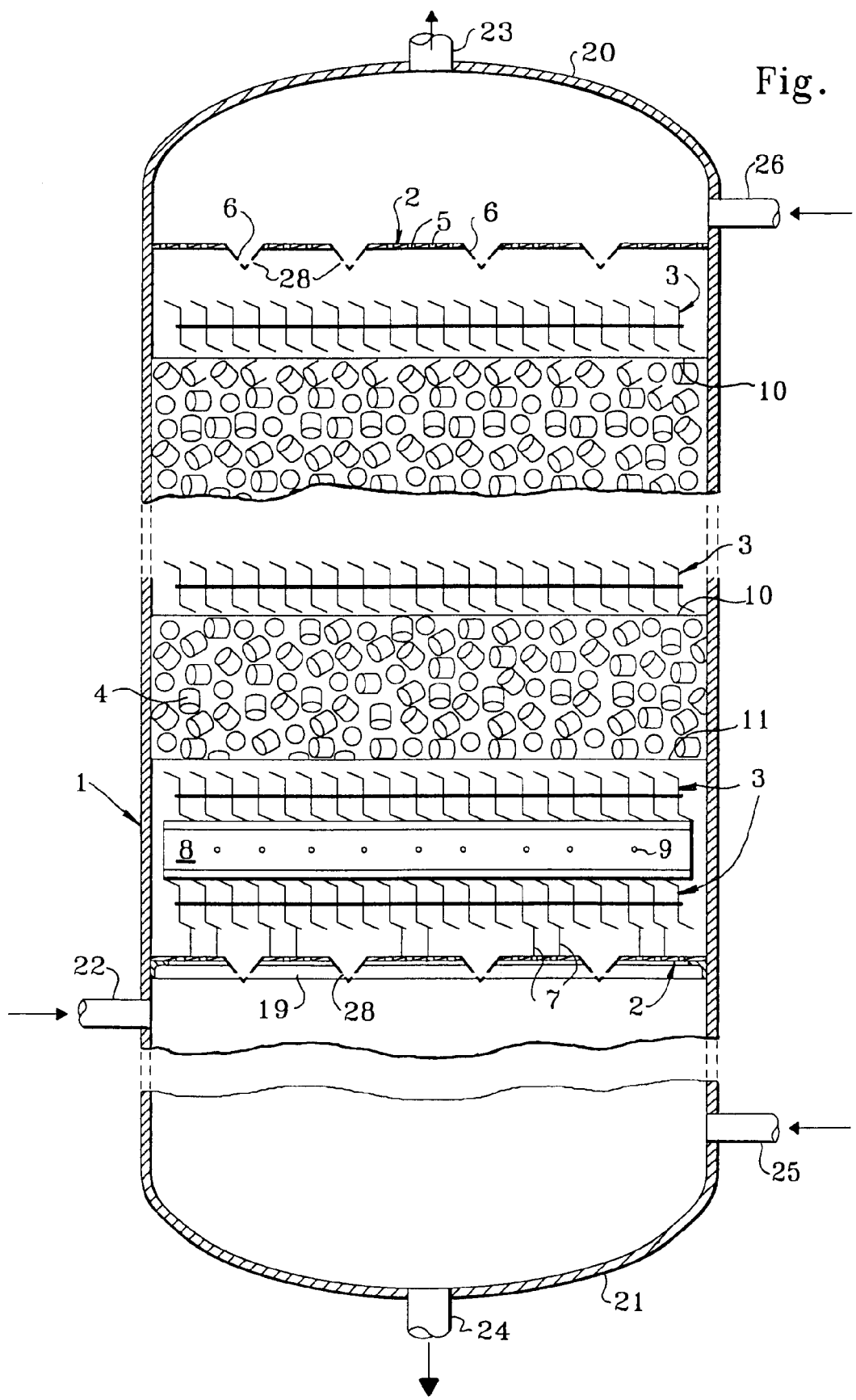
FIG. 4 is a sectional side view of one embodiment of the subject gas-liquid contacting apparatus employed as a part of a fractional distillation column (1) which employs V-shaped downcomers (6).

FIG. 4 is a vertical cross-section of a portion of a fractionation column 1 employing yet another embodiment of the subject invention. The column comprises a cylindrical outer wall, a sealed upper end (20) and sealed lower end (21). A feed stream comprising the several chemical compounds to be separated is charged to the column at a point set by calculation and operating practice. In the embodiment shown in the Figure, the feed stream enters via feed line (22). Overhead vapor is removed from the column via line (23) and passed to a conventional overhead condenser not shown. Condensation of this vapor forms a liquid which is at least partially returned to the column as reflux via the reflux return line (26). At the bottom of the column, liquid is withdrawn via line (24). A portion of this bottoms liquid is passed into a conventional reboiler not shown which preferably vaporizes at least a portion of the bottoms liquid and generates reboiling fluid returned to the column via line (25). The subject invention could be employed in other column configurations. For instance, the column could be set up as a pure stripping column, with the feed stream entering at or near the top of the column.

The internal cylindrical cross-sectional area of the column 1 is compartmentalized by a plurality of evenly spaced multiple downcomer fractionation trays 2. While only two trays are shown in the figure, commercial columns contain a total of ten to more than one hundred such trays. The vertical distance between the same part of two trays or tray spacing is uniform in any one portion of the column. It may differ however in different portions of the column such as above and below the feed point. Each fractionation tray in this embodiment is comprised of a number of V-shaped downcomers 6 which distribute collected liquid through openings 28 onto the optional dumped packing 4 located below the tray. The trays also comprise substantially flat perforated decking sections 5 through which vapor rises on its way to the top of the column. Three sublayers of low surface area contacting grid 3 are stacked upon the lower fractionation tray 2. To ensure free transport of liquid-contacting froth across the decking portions of the tray and into the downcomers, the bottommost grid sublayer is suspended a short distance above the upper surface of the tray by a number of stick-like grid supports 7 which project upward from the tray surface. While the bottommost grid sublayer may rest-upon the actual decking surface of the tray, it is preferred that the lowermost grid is retained a short distance above the surface of the decking as shown in the Figure. In many instances this will occur automatically as the grid will rest upon the top of a weir or other upward projection of the tray.

Located immediately above the topmost of the three sublayers is a porous support and retention screen 11 for the optional dumped packing 4 located above the grid bundle. This high surface area packing may be any of the conventionally commercially available packings intended for vapor liquid contact. In this embodiment this dumped packing material fills a large portion of the cylindrical void space between the pair of fractionation trays and extends upward to an upper packing retention screen 10. Just above the packing retention screen 10, an optional top layer of low surface area grid structure formed by a single grid layer 3 forms the top element in the sandwich of materials located between the pair of fractionation trays in this embodiment. The top of this grid is intentionally spaced down from the bottommost part of the next higher tray. It must be noted that this sandwich is an extreme extension of one embodiment. Normally a considerable percentage of the cylindrical volume between the trays is left empty.

While dumped packing is shown in the Figure, it may be replaced by other high surface area packing such as structured packing.

Figure 5:
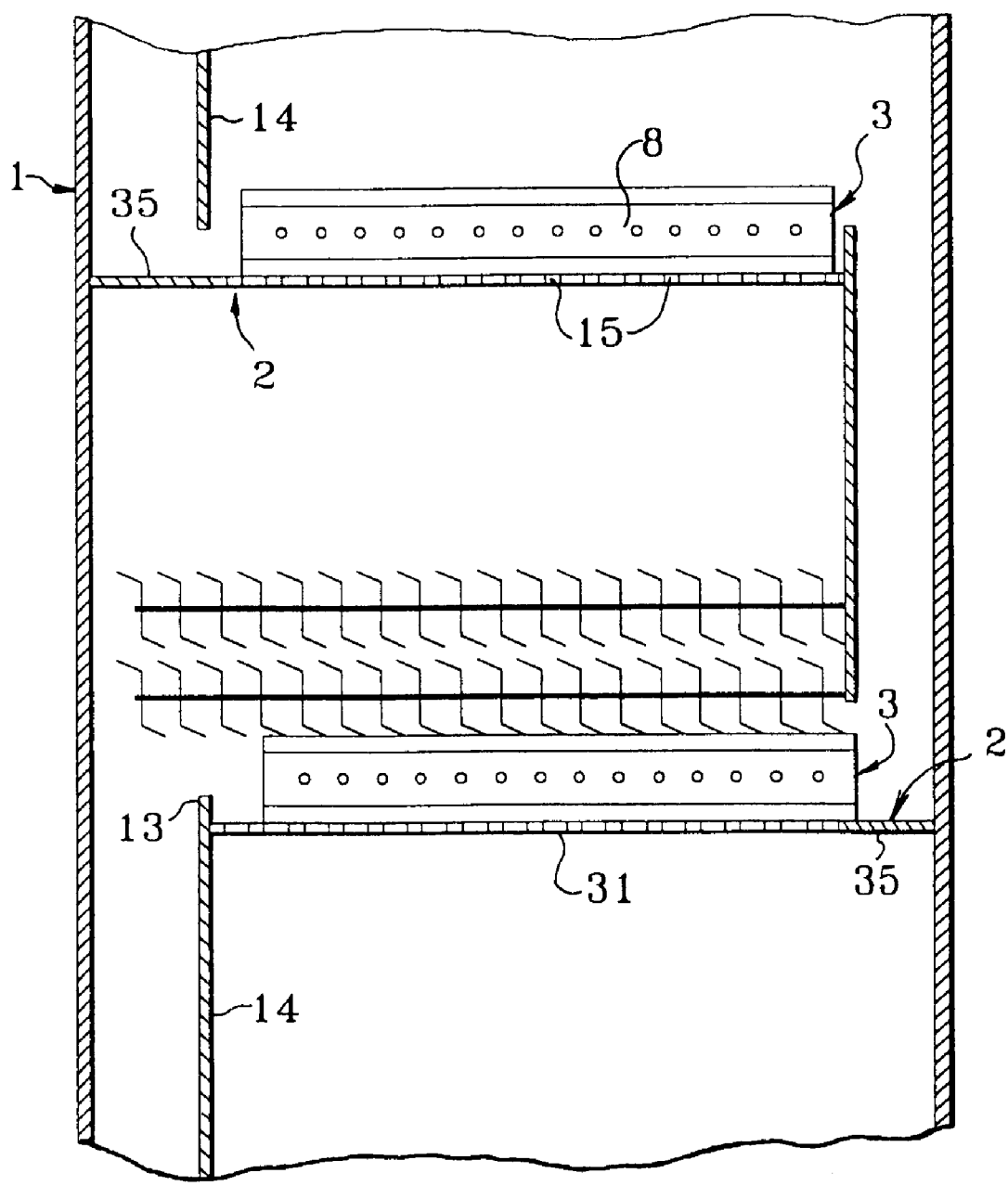
FIG. 5 is a cross-section of a portion of a column having a pair of cross-flow trays (2) plus low surface area grids (3).

FIG. 5 is a cross-sectional view of a section of a fractionation column 1 containing a pair of traditional cross-flow sieve trays 2. Liquid from above flows downward through a chordal downcomer formed by the wall 14 and curved inner surface of the column. The liquid impacts the imperforate receiving pan 35 and then travels horizontally across the decking 31 of the tray. Vapor rises through the perforations 15 in the decking and causes vapor-liquid contact. The liquid then overflows the outlet weir 13 and enters the inlet of the downcomer leading to the next lower tray. The bottom tray supports three sublayers of low surface area grid 3 while only a single layer of grid 3 rests upon the upper tray. In both instances, the grids 3 are oriented such that the blades 8 run from the receiving pan to the outlet weir. The blades are therefore aligned with the general direction of liquid and froth movement across the tray. The two upper sublayers on the bottom tray are aligned perpendicular to lowest grid sublayer.

Figure 6A:
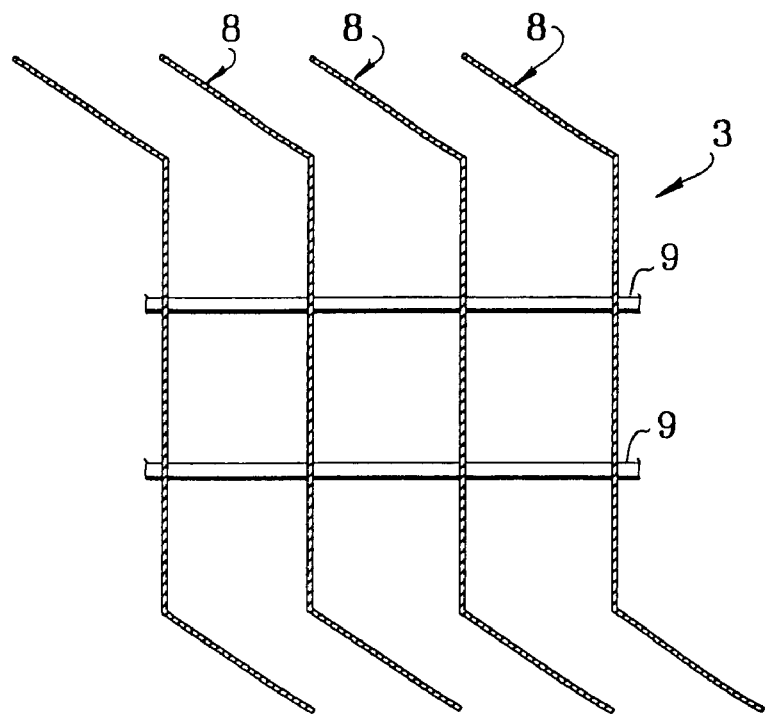
FIGS. 6a and 6b show two different possible structures for the low surface area grid bundles (3).

FIG. 6a is an enlarged view looking sideways at a small portion of a suitable low surface area grid. Each grid is formed by a large number, e.g., 20 to 40 or more, individual grid blades 8. The imperforate grid blades are held in a rigid position by a number of grid stringers 9 which extend through the grid 3. The grid stringers, which hold the blades in place, may simply fall into notches or they may be welded to each blade to form a rigid substantially inflexible structure. The overall grid bundles can theoretically be formed as a monolithic cylindrical pad-like structure approximately equal in size to the internal diameter of the fractionation column. However, it is much more feasible to form smaller grid bundles in the shape of rectangular sections about 0.3 to 0.5 meters wide which are placed on the trays or on supports extending across the column. The grid bundles can be fabricated to fit between the walls of adjacent downcomers and rest upon the tray deck or the top of the downcomers. The length of each grid bundle can be equal to the width of the column.

Figure 6B:
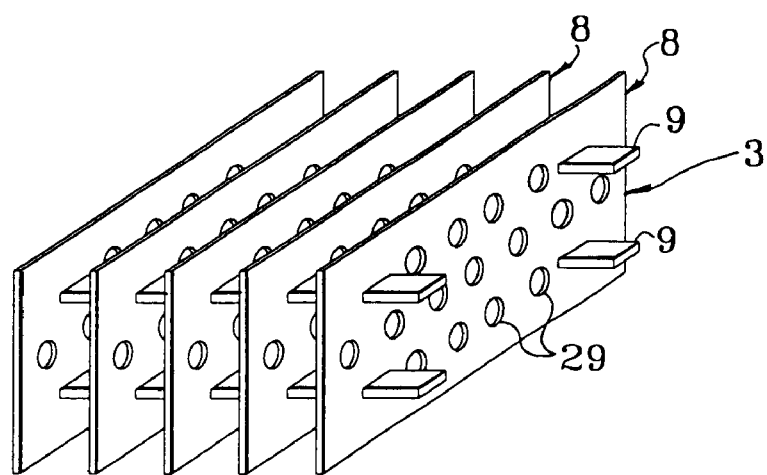

FIG. 6b differs from FIG. 6a in showing a grid structure formed from flat blades 8 rather than the bent blades of FIG. 6a. These blades would result in even lower pressure drop but are not as effective in increasing the capacity of the tray. The blades of this Figure have a number of rather large circular openings 29 spaced across their face. These openings are optional but will allow good froth admixture on the tray and the movement of froth through the blades.

The grid designs of FIGS. 6a and 6b share the common characteristic of having relatively large vertical channels which allow unobstructed upward vapor flow. Some grid structures have angled portions of the blades which cross into the vertical channels. The width of the channels will be larger, typically larger than 3 cm, and the channels more uniform than in a structured packing. Portions of the blades themselves may intersect or be attached to each other at multiple points thereby eliminating the need for the connecting grid stringers 9.

Figure 7:
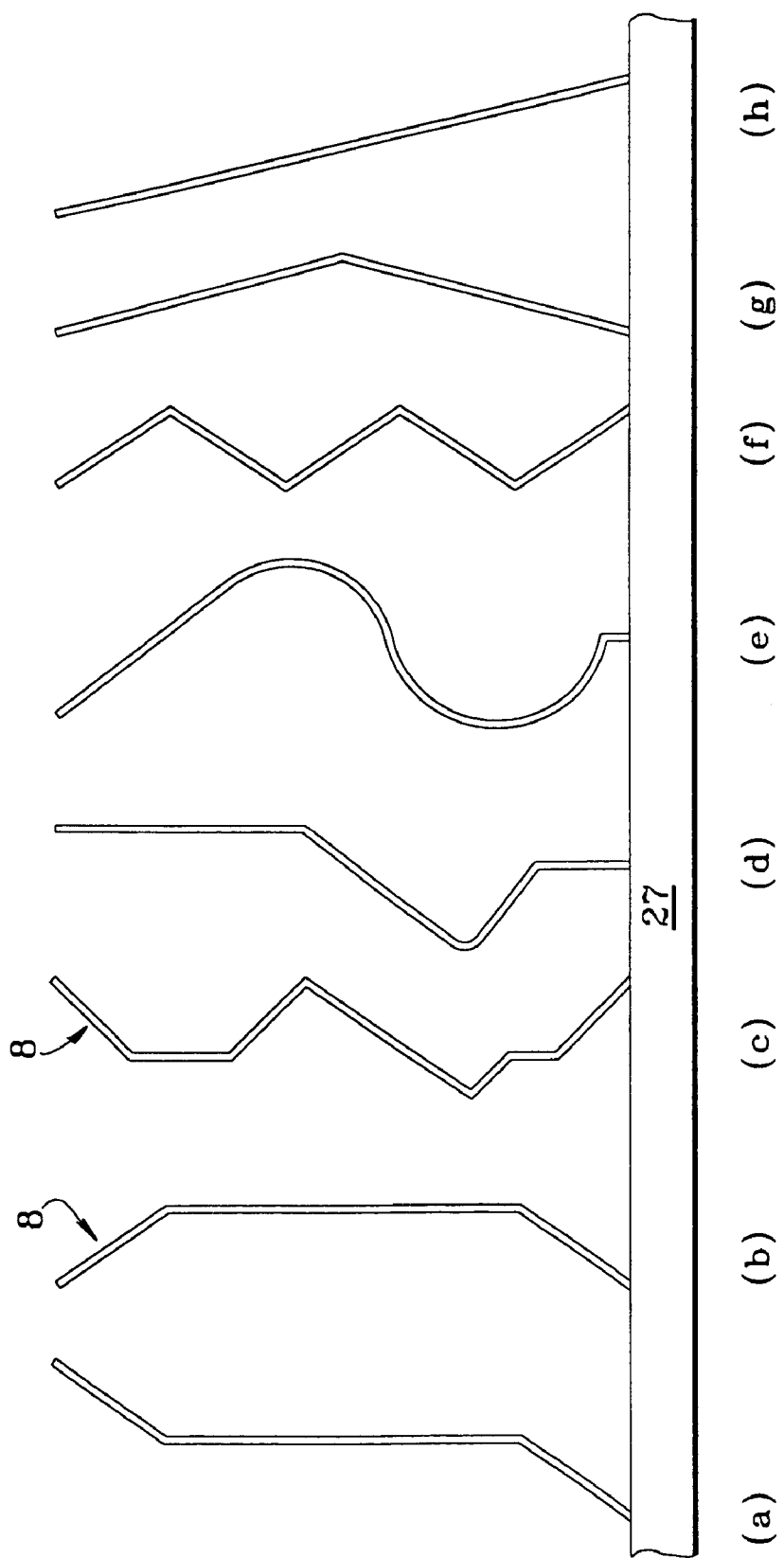
FIGS. 7 and 8 illustrate alternative structures of the individual low surface area grid plates (8).
Figure 8:
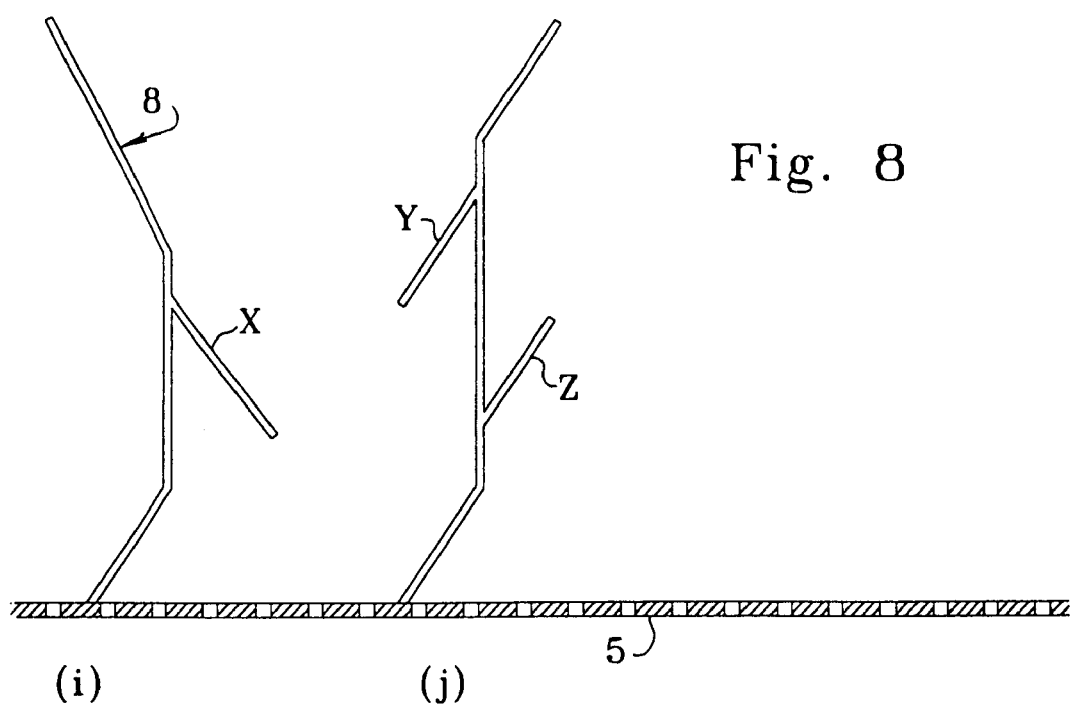

FIGS. 7 and 8 illustrate ten different alternative structures (a)–(j) for the blades 8 of the low surface area grid bundle. Many more are possible. In FIG. 7 the representative blades 8 rest upon a horizontal support bar 27 which may be part of a downcomer. In FIG. 8 the blades rest directly upon the upper surface of a section of perforated tray decking 5.

It is highly preferred that at least one portion of the blade structure is inclined from vertical such that one portion of the blade intercepts the rising vapor flow and the other side provides an inclined surface for increased liquid retention. This provides a greater increase in the capacity of the tray for a reason as yet unknown. The inclined straight blade (h) is the simplest example of such an inclined portion. The more complicated bidirectional blades (c) and (f) offer increased rigidity but at higher cost. There is no known requirement for sharp bends and it is believed the inclined surface can be provided by one or more curves as shown by blade (e). It is preferred that the blade is not shaped in a manner which creates a concave shape. The shape of blade (a) is therefore preferred over the shape of blade (b).

The two low surface area grid blades 8 of FIG. 8 differ from those of FIG. 7 in that each blade has one or more tabs (x, y, z) extending from the major surface of the blade. The tabs may protrude away from both sides of the blade as shown by tabs y and z of blade (j), which extend in opposite directions. The tabs can comprise separate elements fastened to the blades as by welding. However, it is preferred that the tabs are formed by a conventional metal forming procedure in which several cuts are made in the blade and the tab is formed by bending along the uncut metal at the base of the tab. This operation will form perforations in the blade. These perforations will conform in shape to the tabs and may augment other perforations in the blade.

Figure 9:
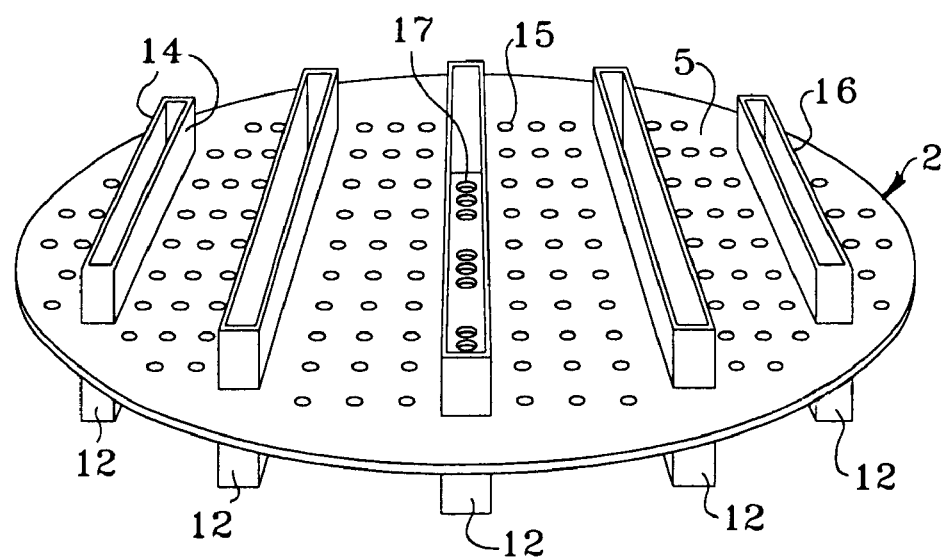
FIG. 9 is an isometric view of a multiple downcomer tray showing the structure of rectangular downcomers (12) and decking areas (15).

FIG. 9 illustrates a multiple downcomer type fractionation tray which may be employed in the subject invention. The flat discoid tray 2 of FIG. 9 has six decking sections 5, each of which has a large number of perforations 15 for the upward passage of vapor. This particular tray 2 is illustrated as having five rectangular downcomers 12 evenly spaced across the surface of the tray. The downcomers extend away from both bottom and top surfaces of the tray and are separated by strips of planar decking 5 intended for upward vapor passage. All of the upward vapor flow in the column should pass through the perforations 15. Each downcomer borders two flat strips of decking. Each downcomer has a rectangular open upper end formed by the upward extension of the side and end walls upward beyond the decking surface. In a similar manner the downcomers extend below the tray, with the lower end of each downcomer being closed by a horizontal seal plate having liquid sealable perforations 17 for the passage of liquid. These perforations 17 of the tray are sized to collectively allow the passage of the entire downward liquid flow in the column during operation while retaining sufficient liquid in the downcomers to prevent upward vapor flow.

FIG. 10 illustrates a sectional side view of a single multiple downcomer tray 2 similar to FIG. 9 and comprising four parallel rectangular trough-like downcomers 12 spaced across the tray. A flat decking section 5 is present on either side of each downcomer. The rectangular structure of the downcomers allows the side walls 32 to act as beams providing vertical support for the decking sections. In this embodiment the side walls and end walls 33 are imperforate and all of the on-stream downward liquid flow travels through the plurality of liquid sealable openings 17 provided in the flat downcomer seal plates 34. A single layer of low surface area grid 3 comprising the substantially vertical blades 8 and connecting stringers 9 rests directly upon the upper surface of the decking 5 of the tray between the downcomer sidewalls, which extend upward beyond the bottom portion of the grid. Vapor rising upward through the perforations 15 therefore impinges upon the blades 8 of the grid.

FIG. 11 is the view seen looking downward in a fractionation column 1 sectioned above a crossflow fractionation tray 2. Liquid falling down a chordal downcomer from the next tray above falls upon the imperforate receiving pan 35 and proceeds horizontally across the tray 2 towards the top of the Figure. Vapor from below rises through the large number of small diameter openings 15 evenly distributed across the decking 5. For simplicity these perforations 15 are shown only on a portion of the tray. Upon reaching the other side of the crossflow tray, the liquid flows over the outlet weir 13 and downward into a chordal downcomer leading to the next lower tray. This flow is similar to that depicted in FIGS. 3 and 5.

A primary distinguishing characteristic of this apparatus is the provision of differently angled low surface area grids 3 on the decking surface. The grids are in several flat bundles, with each grid bundle comprising a plurality of blades 8 and the connecting perpendicular stringers 9. The blades of different bundles are aligned in different directions as shown. These grids are shaped, placed and aligned such that vapor rising from the grid imparts a horizontal force to the froth on the tray, with this force tending to cause the new froth to diverge towards the sides of the tray. This is intended to reduce the tendency of liquid to stagnate in the side areas alongside the direct flow path from the receiving pan 35 to the outlet weir 13. A second pair of angled grid bundles 3 located on the outlet half of the tray then speeds the collection of the froth from those areas and its passage into the outlet downcomer. These two sets of angled grids 3 are separated by an intermediate section of grids which are aligned parallel to the outlet weir 13. The angled grid bundles can differ in number from the four shown in the drawing and can be used on only a smaller portion of the tray. For instance, aligned grids located exclusively on the inlet side of the tray may be sufficient to promote the required froth movement. Additionally as shown on the drawing, sizable portions of the tray deck may be free of any grids. It may be noted this figure shows grid bundles of the same layer aligned in different directions, as opposed to prior figures in which sublayers were aligned in different directions.

The low surface area grid can be in the form of only a single layer or several sublayers. The height of the grid is such that it does not fill the area between vertically adjacent trays. The percentage of the vertical distance between trays filled by the grid material will depend somewhat on tray spacing and will increase as tray spacing is reduced. It is preferred that between 10 to 75 percent of the space between trays is filled with low surface area grid. It is highly preferred the low surface area grid fills less than one-half the space between the trays, with less than one-third of the space being filled being highly preferred.

The subject invention may be applied to multiple downcomer trays such as described in the previously cited U.S. Pat. No. 3,410,540. Multiple downcomer trays have several distinguishing physical characteristics. For instance, a multiple downcomer tray does not have the receiving pan shown on the cross-flow trays discussed above. This is the normally imperforate section of tray deck located below the bottom of a downcomer. It is therefore the area of a tray upon which the liquid descending through the downcomer impacts before passing horizontally onto the perforated decking of the tray. Receiving pans are normally located directly below the downcomer leading from the next above conventional fractionation tray as shown in FIGS. 3, 5 and 11. The horizontal surface area of a multiple downcomer fractionation tray is divided into depressed areas functioning as downcomer means and flat vapor-liquid contacting area normally referred to as decking. There are no imperforate areas allocated to receiving descending liquid from the tray located immediately above.

Another distinguishing feature of a multiple downcomer type fractionation tray is the provision of a relatively large number of parallel downcomer means across the tray. Each tray can employ from one to fifteen or more downcomers. These downcomer means are spaced relatively close together compared to those of the more common crossflow fractionation trays as they are spread across the surface of the tray rather than being at the periphery of the tray. The distance between adjacent downcomers (measured between their side walls) of the same multiple downcomer tray will be between 0.2 and 1.0 meters and preferably less than 0.5 meter. This results in a tray having a unique design consisting of the alternating decking areas and downcomer means evenly spaced across the upper surface of the fractionation tray, as shown in FIGS. 4, 9 and 10.

The structure of the downcomers of a multiple downcomer tray is also unique compared to the downcomers employed upon crossflow fractionation trays. The downcomer means do not extend downward to the next fractionation tray. Rather they stop at a much higher intermediate level located in the void volume between the two trays. The downcomer descending from the tray above therefore normally stops well above the deck surface of a lower tray and above the inlet to the downcomers of the tray below. The inlet to the downcomer of a tray functions as the outlet weir of the tray, and the bottom of the downcomer is preferably well above the outlet-weir of the lower tray. The horizontal ends-on cross-section of the downcomers can have a wide variety of shapes ranging from rectangular as in FIG. 1 to triangular as in FIG. 4.

A very distinctive feature of a multiple downcomer fractionation tray is the provision of a liquid sealable means near the bottom of the downcomer. The bottom of the downcomer is partially closed off to retard the direct downward flow of liquid out of the downcomer. This causes the accumulation and retention of froth, which allows it to separate into clear liquid. The accumulated liquid seals the downcomer to the upward flow of vapor. This liquid sealable outlet is located well above the deck of the tray located immediately below. Preferably it is at a level above the inlet of the downcomers associated with this next lower tray. The clear liquid is collected in the lower portion of the downcomer and spills forth upon the next lower tray through the openings in the bottom of the downcomer. Some liquid may, if desired, exit through the openings in the downcomer side walls. The openings are grouped together and located such that the exiting liquid does not fall into a downcomer of the next lower tray.

In the embodiments employing V-shaped downcomers, the perforations 28 in the downcomer side walls are preferably arranged in one or more rows running along the major axis of the downcomer. It is preferred that the holes are located in the side walls rather than along the bottom of the V-shaped downcomer. This helps impart horizontal velocity to the egressing liquid causing it to travel away from the downcomer. This is beneficial in spreading the liquid over any high surface packing 4 which is located below the tray, hence ensuring more uniform wetting of the packing. It is also useful in directing the liquid onto the decking areas of the tray below depending on the orientation and location of the lower tray decks. The perforations in the downcomer side walls are preferably circular but could have other shapes including horizontal or diagonal slots. The use of a smaller number of larger perforations is preferred although the perforations should be located more or less uniformly along the length of both side walls of the downcomer in a single row to again aid in spreading the liquid over the suspended high surface packing. Circular openings of about 0.5–2.5 centimeters diameter are suitable. An important factor in the placement of the downcomer perforations is the provision of an adequate distance between the upper surface of the tray, which may be coextensive with downcomer inlet, and the perforations to allow the entering froth to separate into clear liquid and vapor. This is important to good tray efficiency and performance in general. This distance should also provide sufficient liquid head to prevent the upward passage of vapor through the downcomer perforations. This desirable placement of the downcomer perforations can be characterized as being in the lower third of the downcomer sidewall.

The decking between any downcomers of a multiple downcomer type tray is preferably substantially planar, that is flat, and orientated in a horizontal plane. These decking portions are provided with uniformly distributed openings of adequate total cross-sectional open area to allow the expected vapor flow to pass upward through the tray at a reasonable velocity. The uniform circular openings of a standard sieve tray are preferred but can be supplemented by vapor flow directing slots. The open area provided by deck perforations may be as high as 30–45% of the tray deck, as compared to a lower area of up to 20% normally used on ripple trays. The circular perforations may be up to 1.87 cm (0.75 in) in diameter.

The apparatus according to the present invention can be in the form of a new apparatus or as a modification to an existing apparatus. That is, an existing trayed column may be modified to employ the subject invention by placement of low surface area grid on some or all of the existing trays.

One embodiment of the invention may be characterized as a fractional distillation apparatus comprising a vertical enclosed column (1) having a circular cross section and an upper first end (20) and a lower second end (21); a pair of vertically spaced apart multiple downcomer fractionation trays (2) comprising a lower first tray and an upper second tray, with the trays extending across substantially all of the cross-sectional area of the column (1), and with the trays (2) having separate vapor passage decking sections (5) and parallel liquid collection downcomers (6, 12) distributed across the trays (2), with the liquid collection downcomers extending away from the tray (2) toward the second end of the column, and with perforations (28) for liquid passage being located in the liquid collection downcomers; and, a layer of low surface area structured grid packing (3) resting upon the first tray of said pair of fractionation trays, with the layer of grid packing extending toward the second tray (2) for a distance equal to from about one-tenth to about three-fourths of the vertical distance between the first and second trays (2).

A further embodiment of the invention may be characterized as a fractional distillation apparatus comprising a vertical enclosed column (1) having a circular cross section and an upper first end (20) and a lower second end (21); a pair of vertically spaced apart discoid fractionation trays (2) extending across substantially all of the cross-sectional area of the column (1), with the trays having separate substantially flat perforated decking sections (5) and liquid collection downcomers (6,12), which downcomers extend away from the tray (2) towards the lower second end of the column (1), and with additional perforations (17,28) for liquid passage being located in the liquid collection downcomers; a layer of low surface area structured grid packing (3) resting upon a lower first tray (2) of said pair of fractionation trays; and, a layer of high surface area packing (4) located above the layer of low surface area structured grid packing (3).

As previously mentioned an optional addition to the subject invention is a bed of high surface area packing. These optional beds are located between two trays and preferably do not contact either tray. As they receive the necessary liquid from the next tray above their location is described as under the top tray. Tests have shown that an effective high surface area packing section need only be relatively thin, say 200 mm top to bottom, and so wall effects are insignificant. A minimum bed thickness of 10 cm is desired, with beds up to 150 cm thick being contemplated.

The amount of high surface area packing used with any one tray pair is preferably less than 50 percent of the volume of the column between the upper and lower trays of the pertinent tray pair. It is preferred that no high surface area packing material is placed directly on the surface of the trays. This allows conventional frothing and liquid flow to occur.

A bed of the optional high surface area packing provided in the column will preferably be thicker, measured top to bottom, than the first layer of low surface area grid structure located below it. Any optional second layer of low surface area grid structure located above the bed of high surface area packing is preferably thinner than the first (lower) layer of low surface area grid structure. More precisely, it is preferred that the first (lower) layer is at least two times as thick, and more preferably at least three times as thick as the second (upper) layer of low surface area grid packing.

The optional packing beds may contain any of the many known random packings; e.g., rings, spheres, saddles, or structured (ordered) bed packings; e.g., corrugated, rolled, screens or plates. Examples of random and structured packings are provided in U.S. Pat. Nos. 5,200,119 and 5,132,056.

The high surface area packing beds may be suspended by a porous woven wire screen. The screen itself may be held in place in a number of ways. The screen may rest on a grid bundle or a plurality of support bars which crisscross the internal volume of the column in a plane parallel to the trays. The screen or the individual packing elements may alternatively be suspended (hung) from the tray above. These mechanical details may be varied to suit individual situations and are not deemed a limitation on the inventive concept.

Some embodiments of the invention include an element which functions to supply liquid to the optional high surface packing bed. Openings in the decking material may be used for this purpose in addition to allowing vapor flow. Some portion; e.g., 25–40 vol. % of the liquid flowing across the tray deck 5, may therefore flow downward through openings in the deck to allow liquid to flow onto the packing 4. Those skilled in the art will recognize there are a number of ways to distribute liquid from the tray to the packing. It is preferred to avoid the use of any mechanically complex system involving conduits, pipes and valves, inclined troughs, etc. The liquid which is spread across the packing may be derived from a downcomer, a separate liquid collection area or from the tray deck itself. For these purposes it is preferred to utilize some form of "dual flow" tray decking. That is, the tray intentionally allows liquid to "weep" downward as by having some larger diameter holes or devices to promote liquid flow through the holes. Valving means known to the art may also be placed on the tray to regulate liquid and vapor flow and to accommodate variations in these flows due to changes in feed or reflux rates in the column.

The trays of the subject invention are fractionation trays as compared to liquid distributors found in packed columns. Some characteristics of fractionation trays include a much closer vertical spacing than for redistributors; a design which causes intimate, vigorous contact of liquid retained on the tray with vapor passing upward through the tray and the formation of froth on the surface of fractionation trays; and an abundance of closely spaced perforations across a high percentage of the decking area of the fractionation trays. On a fractionation tray, a large percentage, approximately 70%, of the tray's cross-sectional area is comprised of decking. The conventional redistributors of packed columns employ no decking. On a tray, mass transfer, that is, purification or separation occurs; on a conventional redistributor, no mass transfer occurs.

What is claimed:

1. A vapor-liquid contacting apparatus comprising:
   (a) a vertical enclosed column (1) having a circular cross section, an upper first end (20) and a lower second end (21);
   (b) a plurality of evenly spaced-apart fractionation trays including a pair of vertically spaced apart fractionation trays (2), comprising a lower first and an upper second tray, with the trays being substantially planar and extending horizontally across substantially all of the cross-sectional area of the column (1), and with the trays (2) having perforations (15) evenly distributed across decking sections (5) of the tray (2), which decking sections are devoid of downcomers (12,6); and,
   (c) a layer comprising low surface area structured grid packing (3) supported by and resting upon an uppermost part of the first tray (2) the first tray (2) of said pair of fractionation trays, with the layer of structured grid packing (3) extending upward toward the second tray for a distance equal to from about one-tenth to about three-quarters of the vertical distance between the first and second trays with the low surface area structured grid packing comprising bent blades (8) having inclined surfaces.

2. A fractional distillation apparatus comprising:
   (a) a vertical enclosed column (1) having an upper first end (20) and a lower second end (21);
   (b) a pair of vertically spaced apart multiple downcomer fractionation trays (2) comprising a lower first tray and an upper second tray, with the trays (2) extending across substantially all of the cross-sectional area of the column (1), and with the trays (2) having separate vapor passage decking sections (5) and parallel liquid collection downcomers (6, 12) distributed across the trays (2), with the liquid collection downcomers (6, 12) extending away from the tray (2) toward the second end of the column, and with perforations (28) for liquid passage being located in the liquid collection downcomers; and,
   (c) a layer of low surface area structured grid packing (3) resting upon the first tray of said pair of fractionation trays, the grid packing (3) comprising individual blades (8) having a vertical central portion and inclined upper and lower portions which are inclined on opposite sides of the vertical central portion of the blade, and with the layer of grid packing (3) extending toward the second tray for a distance equal to from about one-tenth to about three-fourths of the vertical distance between the first and second trays (2).

3. The apparatus of claim 2 wherein the layer of low surface structured grid packing (3) extends upward from the first tray for a distance less than one-third of the vertical distance between the first and second trays.

4. The apparatus of claim 2 further characterized in that the layer of low surface area structured grid packing (3) rests upon an upper edge of a downcomer (12) side wall (32), which sidewall holds the layer of low surface area structured grid packing above the upper surface of the vapor passage decking sections (5) of the lower first tray to provide void volumes located between the vapor passage decking sections (5) and the bottom surface of the layer of low surface area structured grid packing (3).

5. The apparatus of claim 2 further characterized in that a bed of packing material (4) is located between the bottom of the upper second tray and the upper surface of the structured grid packing (3) with a cylindrical void volume (v) being located between the bottom of the bed of packing material (4) and the layer of low surface area grid packing (3) is comprised of parallel bent blades, which blades have inclined surfaces and are connected by perpendicular stringers.

6. The apparatus of claim 5 wherein the cylindrical void volume (v) has a height equal to at least $\frac{1}{10}$th of the tray spacing between the pair of trays.

7. The apparatus of claim 2 wherein the downcomers have sidewalls having an upper portion which extend upward away from decking sections, and the low surface area grid packing rests upon the decking sections between the upper portion of the sidewalls.

8. A fractional distillation apparatus comprising:
   (a) a vertical enclosed column (1) having a circular cross section and an upper first end (20) and a lower second end (21);
   (b) a pair of vertically spaced apart discoid fractionation trays (2) extending across substantially all of the cross-sectional area of the column (1), with the trays having separate substantially flat perforated decking sections (5) and liquid collection downcomers (6, 12), which downcomers extend away from the tray (2) towards the lower second end of the column (1), and with additional perforations (17,28) for liquid passage being located in the liquid collection downcomers (6,12);
   (c) a layer of low surface area structured grid packing (3), resting upon a lower first tray (2) of said pair of fractionation trays; the grid packing (3) comprising a plurality of parallel blades (8) having at least two spaced apart bends yielding inclined surfaces, with the blades being connected by perpendicular stringers and,
   (d) a layer of high surface area packing (4) located above the layer of low surface area structured grid packing (3).

9. The apparatus of claim 8 wherein a second layer of low surface area structured grid packing (3) is located below the higher tray of the pair of fractionation trays (2), with a cylindrical void volume being located between the lower surface of the second tray (2) and the top surface of the second layer of low surface area structured grid packing (3).

10. The apparatus of claim 8 further characterized in that the liquid collection downcomers (6, 12) comprise triangular cross-section downcomers (6).

11. The apparatus of claim 8 further characterized in that the layer of low surface area structured grid packing (3) rests upon an upper edge of a downcomer (12), which holds the layer of low surface area structured packing (3) above the decking sections (5) to provide a plurality of void volumes located between the decking section and the bottom surface of the layer of low surface area structured grid packing.

12. The apparatus of claim 8 further characterized in that the layer of low surface area structured grid packing (3) rests upon a portion of a downcomer (6) which extends above the flat perforated decking sections (5).

13. A vapor-liquid contacting apparatus comprising:
   (a) a vertical enclosed column (1) having a circular cross section, an upper first end (20) and a lower second end (21);
   (b) a plurality of evenly spaced-apart fractionation trays including a pair of vertically spaced apart fractionation trays (2) comprising a lower first and an upper second tray, with the trays being substantially planar and extending horizontally across substantially all of the cross-sectional area of the column (1), and with the trays (2) having perforations (15) evenly distributed across decking sections (5) of the tray (2), which decking sections are devoid of downcomers (12,6); and,
   (c) a layer comprising low surface area structured grid packing (3) supported by an upper portion of a downcomer (12) of the first tray (2) of said pair of fractionation trays, with the layer of structured grid packing (3) extending upward toward the second tray for a distance equal to from about one-tenth to about three-quarters of the vertical distance between the first and second trays with the low surface area structured grid packing comprising bent blades (8) having inclined surfaces.

14. A vapor-liquid contacting apparatus comprising:
   (a) a vertical enclosed column (1) having a circular cross section, an upper first end (20) and a lower second end (21);
   (b) a plurality of evenly spaced-apart fractionation trays including a pair of vertically spaced apart fractionation trays (2) comprising a lower first and an upper second tray, with the trays being substantially planar and extending horizontally across substantially all of the cross-sectional area of the column (1), and with the trays (2) having perforations (15) evenly distributed across decking sections (5) of the tray (2), which decking sections are devoid of downcomers (12,6); and,
   (c) a layer comprising low surface area structured grid packing (3) comprised of separate bundles having blades (8) aligned in different directions, with the low surface area grid packing being supported by the first tray (2) of said pair of fractionation trays, with the layer of structured grid packing (3) extending upward toward the second tray for a distance equal to from about one-tenth to about three-quarters of the vertical distance between the first and second trays with the low surface area grid packing comprising bent blades (8) having inclined surfaces.

\* \* \* \* \*

UNITED STATES PATENT AND TRADEMARK OFFICE
CERTIFICATE OF CORRECTION

PATENT NO.    : 6,293,528 B1                                      Page 1 of 1
DATED         : September 25, 2001
INVENTOR(S)   : Daniel R. Monkelbaan et al.

It is certified that error appears in the above-identified patent and that said Letters Patent is hereby corrected as shown below:

Column 15,
Line 45, delete the second occurrence of the phrase "the first tray (2)."

Signed and Sealed this

Fifth Day of March, 2002

Attest:

Attesting Officer

JAMES E. ROGAN
Director of the United States Patent and Trademark Office